(12) United States Patent
Zhang (10) Patent No.: US 11,731,720 B2
(45) Date of Patent: Aug. 22, 2023

(54) METHOD FOR CONTROLLING ELECTRIC VEHICLE AND ELECTRIC VEHICLE

(71) Applicant: NINE INTELLIGENT (CHANGZHOU) TECH CO., LTD., Jiangsu (CN)

(72) Inventor: Shengqiao Zhang, Beijing (CN)

(73) Assignee: NINE INTELLIGENT (CHANGZHOU) TECH CO., LTD., Jiangsu (CN)

( * ) Notice: Subject to any disclaimer, the term of this patent is extended or adjusted under 35 U.S.C. 154(b) by 50 days.

(21) Appl. No.: 16/626,315

(22) PCT Filed: May 10, 2019

(86) PCT No.: PCT/CN2019/086408
§ 371 (c)(1),
(2) Date: Dec. 23, 2019

(87) PCT Pub. No.: WO2020/143142
PCT Pub. Date: Jul. 16, 2020

(65) Prior Publication Data
US 2021/0403110 A1   Dec. 30, 2021

(30) Foreign Application Priority Data

Jan. 7, 2019 (CN) .......................... 201910010455.4

(51) Int. Cl.
*B62H 5/08* (2006.01)
*B62J 45/20* (2020.01)
(Continued)

(52) U.S. Cl.
CPC ............... *B62H 5/08* (2013.01); *B60R 25/24* (2013.01); *B62J 3/10* (2020.02); *B62J 6/22* (2020.02);
(Continued)

(58) Field of Classification Search
CPC .... B60R 25/24; B62J 3/10; B62J 45/20; B62J 45/416; B62J 6/22; B62H 5/08; B62K 11/00; B62K 2202/00
See application file for complete search history.

(56) References Cited

U.S. PATENT DOCUMENTS 6,177,879 B1 * 1/2001 Kokubu ................... B62M 6/90
340/432
9,963,106 B1 * 5/2018 Ricci ................ G08G 1/096725
(Continued)

FOREIGN PATENT DOCUMENTS

CN      103909998 A      7/2014
CN      105083459 A      11/2015
(Continued)

OTHER PUBLICATIONS

JP search results dated May 18, 2021.
(Continued)

*Primary Examiner* — Daniel L Greene
(74) *Attorney, Agent, or Firm* — Yu Gang (57) ABSTRACT

A method for controlling an electric vehicle and the electric vehicle are provided. The method includes: under a condition in which the electric vehicle is in unlocked and motor control shielded states, first predetermined information is detected, wherein the first predetermined information is used for indicating that a rider is located on the electric vehicle; the electric vehicle is controlled to switch from the motor control shielded state to a motor control unshielded state; a predetermined control signal is received in the motor control unshielded state; and a motor of the electric vehicle is controlled to rotate according to a rotational speed corresponding to the predetermined control signal. With the (Continued)

disclosure, the problems of complex operation and poor user experience of a manner for controlling the electric vehicle in the related art are solved.

14 Claims, 3 Drawing Sheets

(51) Int. Cl.
*B60R 25/24* (2013.01)
*B62J 45/416* (2020.01)
*B62J 3/10* (2020.01)
*B62J 6/22* (2020.01)
*B62K 11/00* (2006.01)

(52) U.S. Cl.
CPC ............... *B62J 45/20* (2020.02); *B62K 11/00* (2013.01); *B62J 45/416* (2020.02); *B62K 2202/00* (2013.01)

(56) References Cited

U.S. PATENT DOCUMENTS

| | | | | |
|---|---|---|---|---|
| 10,759,482 B2* | 9/2020 | Shibuya | ................... | B62J 45/20 |
| 2008/0105483 A1* | 5/2008 | Dugas | .................... | B62K 11/00 477/27 |
| 2009/0066499 A1* | 3/2009 | Bai | ........................ | G10K 15/02 340/459 |
| 2011/0060481 A1* | 3/2011 | Kang | ..................... | B60R 25/04 701/2 |
| 2017/0004712 A1* | 1/2017 | Yang | ...................... | G08G 1/205 |
| 2018/0257736 A1 | 9/2018 | Komatsu et al. | | |
| 2019/0077368 A1* | 3/2019 | Hwang | ................. | H04W 4/025 |
| 2019/0378055 A1* | 12/2019 | Whitt | ...................... | B60L 58/13 |

FOREIGN PATENT DOCUMENTS

| | | |
|---|---|---|
| CN | 206394752 A | 8/2017 |
| CN | 206427178 A | 8/2017 |
| CN | 107231797 A | 10/2017 |
| CN | 107444526 A | 12/2017 |
| CN | 207758917 A | 8/2018 |
| CN | 108820121 A | 11/2018 |
| CN | 108909932 A | 11/2018 |
| CN | 109131708 A | 1/2019 |
| CN | 109625149 A | 4/2019 |
| DE | 102013224714 B3 | 2/2015 |
| DE | 202016102459 U1 | 7/2016 |
| JP | 07143603 A | 6/1995 |
| JP | 2013203294 A | 10/2013 |
| JP | 2017176422 A | 10/2017 |
| TW | 201014113 A | 4/2010 |
| WO | 2018056819 A2 | 3/2018 |

OTHER PUBLICATIONS

Corresponding CN search results dated Nov. 30, 2020.
Corresponding CN application search results.
Corresponding European search report dated Sep. 19, 2022.

* cited by examiner

METHOD FOR CONTROLLING ELECTRIC VEHICLE AND ELECTRIC VEHICLE

TECHNICAL FIELD

The disclosure relates to the field of communication, and in particular to a method for controlling an electric vehicle and the electric vehicle.

BACKGROUND

An operation manner of a conventional electric vehicle is as follows.

At Step 1, a rider presses a remote controller first to unlock the electric vehicle (an anti-theft alarm function is disabled).

At Step 2, the rider sits on a seat cushion.

At Step 3, the rider inserts into a mechanical key and opens an electric door lock switch.

At Step 4, the rider presses a P-gear button to unlock an accelerator shifter.

At Step 5, the rider rotates the accelerator shifter to ride normally.

At Step 6, the rider presses the P-gear button to lock an accelerator shifter upon the arrival of a destination.

At Step 7, the rider turns the mechanical key and closes the electric door lock switch.

At Step 8, the rider leaves the seat cushion to park.

At Step 9, the rider presses the remote controller to lock the electric vehicle (the anti-theft alarm function is enabled).

Therefore, the manner for controlling the electric vehicle has the problems of complex operation and poor user experience in the related art.

SUMMARY

The embodiments of the disclosure provides a method for controlling an electric vehicle and the electric vehicle to at least solve the problems of complex operation and poor user experience of a manner for controlling the electric vehicle in the related art.

According to one embodiment of the disclosure, there is provided a method for controlling an electric vehicle, which may include the following steps: under a condition in which the electric vehicle is in unlocked and motor control shielded states, first predetermined information is detected, wherein the first predetermined information is used for indicating that a rider is located on the electric vehicle; the electric vehicle is controlled to switch from the motor control shielded state to a motor control unshielded state; a predetermined control signal is received in the motor control unshielded state; and a motor of the electric vehicle is controlled to rotate according to a rotational speed corresponding to the predetermined control signal.

Preferably, before the first predetermined information is detected, the method may further include the following step: under a condition in which the electric vehicle is in locked and kickstand folded states, when target information matched with a stored target account number is detected, the electric vehicle is unlocked.

Preferably, before the electric vehicle is unlocked, the method may further include the following steps: an input signal sent by a target device having a second wireless communication module via the second wireless communication module is received via a first wireless communication module of the electric vehicle, wherein the input signal carries account number information of a reference account number bound to the second wireless communication module; and under a condition of determining that the account number information is the target information, it is determined that the target information is detected.

Preferably, before the electric vehicle is unlocked, the method may further include the following steps: biological characteristic information within a predetermined detection area is detected via a detection module of the electric vehicle; and under a condition of determining that the detected biological characteristic information is the target information, it is determined that the target information is detected.

Preferably, the step that the electric vehicle is unlocked may include the following step: a power supply circuit powered by a power source of the electric vehicle for the motor is connected by using a switch circuit of the electric vehicle to unlock the electric vehicle.

Preferably, before the first predetermined information is detected, the method may further include the following step: under a condition in which the electric vehicle is in locked and kickstand folded states, when target information matched with a stored target account number is detected, the electric vehicle is unlocked.

Preferably, the step that under a condition in which the electric vehicle is in unlocked and motor control shielded states, first predetermined information is detected may include the following step: under the condition in which the electric vehicle is in the unlocked and motor control shielded states, the first predetermined information is detected by a target sensor mounted on a predetermined position of the electric vehicle.

Preferably, the target sensor includes at least one of the following: a pressure sensor, an infrared sensor and a barometric sensor; the first predetermined information is used for indicating that a bearing state at the predetermined position is a predetermined state, wherein the predetermined state is at least one of the following: the pressure at the predetermined position is greater than or equal to a first target threshold, the image at the predetermined position includes a target image, and the barometric pressure at the predetermined position is greater than or equal to a second target threshold; and the predetermined position includes at least one of the following: a position below a seat cushion of the electric vehicle, a position on a pedal of the electric vehicle, a position on each of shifters at two sides of a handlebar of the electric vehicle, a vehicle body portion in front of the seat cushion of the electric vehicle, a position on a tire of the electric vehicle, a position in the electric vehicle, and a position in a shock absorber of the electric vehicle.

Preferably, the step that a predetermined control signal is received in the motor control unshielded state may include the following steps: the predetermined control signal generated by operating a speed control component of the electric vehicle is received in the motor control unshielded state.

Preferably, after the motor of the electric vehicle is controlled to rotate according to the rotational speed corresponding to the predetermined control signal, the method may further include the following steps: under a condition in which the electric vehicle is in unlocked and motor control unshielded states, second predetermined information is detected, wherein the second predetermined information is used for indicating that the rider leaves away from the electric vehicle; and the electric vehicle is controlled to switch from the unshielded state to the motor control shielded state.

Preferably, after the electric vehicle is controlled to switch from the motor control unshielded state to the motor control shielded state, the method may further include the following steps: under a condition in which the time that the electric vehicle is continuously in the unlocked and motor control shielded states, a wheel speed is zero and a kickstand is in a placed-down state exceeds a target time threshold, the electric vehicle is locked.

Preferably, after the electric vehicle is controlled to switch from the motor control shielded state to the motor control unshielded state, the method may further include the following steps: an electric vehicle state indicator lamp of the electric vehicle is controlled to adjust from a first display state to a second display state, and/or, a prompt tone sent by the electric vehicle is controlled to adjust from a first predetermined prompt tone to a second predetermined prompt tone, wherein the electric vehicle state indicator lamp is located on other positions, except for a position where an instrument is located, on the handlebar of the electric vehicle, or the electric vehicle state indicator lamp is located on an upper portion of a handlebar vertical pipe of the electric vehicle.

According to another embodiment of the disclosure, there is provided an electric vehicle, which may include: a first detection module, configured to detect, under a condition in which the electric vehicle is in unlocked and motor control shielded states, first predetermined information, wherein the first predetermined information is used for indicating that a rider is located on the electric vehicle; a first control module, configured to control the electric vehicle to switch from the motor control shielded state to a motor control unshielded state; a first receiving module, configured to receive a predetermined control signal in the motor control unshielded state; and a second control module, configured to control a motor of the electric vehicle to rotate according to a rotational speed corresponding to the predetermined control signal.

Preferably, the electric vehicle may further include: an unlocking module, configured to unlock, before the first predetermined information is detected, under a condition in which the electric vehicle is in locked and kickstand folded states and when target information matched with a stored target account number is detected, the electric vehicle.

Preferably, the electric vehicle may further include: a second receiving module, configured to receive, via a first wireless communication module of the electric vehicle, an input signal sent by a target device having a second wireless communication module via the second wireless communication module, wherein the input signal carries account number information of a reference account number bound to the second wireless communication module; and a first determination module, configured to determine, under a condition of determining that the account number information is the target information, that the target information is detected.

Preferably, the electric vehicle may further include: a second detection module, configured to detect, before the electric vehicle is unlocked, biological characteristic information within a predetermined detection area via the detection module of the electric vehicle; and a second determination module, configured to determine, under a condition of determining that the detected biological characteristic information is the target information, that the target information is detected.

Preferably, the unlocking module includes: a connection module, configured to connect a power supply circuit powered by a power source of the electric vehicle for the motor by using a switch circuit of the electric vehicle to unlock the electric vehicle.

Preferably, the electric vehicle may further include: an unlocking module, configured to unlock, under a condition in which the electric vehicle is in locked and kickstand folded states and when target information matched with a stored target account number is detected, the electric vehicle.

Preferably, the first detection module may include: a detection unit, configured to detect, under the condition in which the electric vehicle is in the unlocked and motor control shielded states, the first predetermined information by a target sensor mounted on a predetermined position of the electric vehicle.

Preferably, the first receiving module may include: a receiving unit, configured to receive the predetermined control signal generated by operating a speed control component of the electric vehicle in the motor control unshielded state.

Preferably, the electric vehicle may further include: a third detection module, configured to detect, after the motor of the electric vehicle is controlled to rotate according to the rotational speed corresponding to the predetermined control signal, under a condition in which the electric vehicle is in unlocked and motor control unshielded states, second predetermined information is detected, wherein the second predetermined information is used for indicating that the rider leaves away from the electric vehicle; and a third control module, configured to control the electric vehicle to switch from the unshielded state to the motor control shielded state.

Preferably, the electric vehicle may further include: a locking module, configured to lock, after the electric vehicle is controlled to switch from the motor control unshielded state to the motor control shielded state, under a condition in which the time that the electric vehicle is continuously in the unlocked and motor control shielded states, a wheel speed is zero and a kickstand is in a placed-down state exceeds a target time threshold, the electric vehicle.

Preferably, the electric vehicle may further include: a fourth control module, configured to control, after the electric vehicle is controlled to switch from the motor control unshielded state to the motor control shielded state, an electric vehicle state indicator lamp of the electric vehicle to adjust from a first display state to a second display state, and/or, control a prompt tone sent by the electric vehicle to adjust from a first predetermined prompt tone to a second predetermined prompt tone, wherein the electric vehicle state indicator lamp is located on other positions, except for a position where an instrument is located, on the handlebar of the electric vehicle, or the electric vehicle state indicator lamp is located on an upper portion of a handlebar vertical pipe of the electric vehicle.

Through the disclosure, under the condition in which the electric vehicle is in the unlocked and motor control shielded states, the first predetermined information used for indicating that the rider is located on the electric vehicle is detected, the electric vehicle is controlled to switch from the motor control shielded state to the motor control unshielded state (the speed control component is activated), and then the rotational speed of the motor of the electric vehicle may be controlled via the predetermined control signal, so that it is assured that the electric vehicle may be ridden normally. Since when the electric vehicle is in the unlocked and motor control shielded states, the speed control component is controlled via a manner of detecting the first predetermined information used for indicating that the rider is located on the electric vehicle to activate, the speed control component is activated automatically when the rider sits on the electric vehicle, pressing a P-gear button to unlock the speed control component turns out to be unnecessary and the control steps of the electric vehicle are simplified; and therefore, the problems of complex operation and poor user experience of the manner for controlling the electric vehicle in the related art are solved.

BRIEF DESCRIPTION OF THE DRAWINGS

The accompanying drawings are described here to provide a further understanding of the disclosure. The schematic embodiments and description of the disclosure are adopted to explain the disclosure, and do not form improper limits to the disclosure. In the drawings.

DETAILED DESCRIPTION OF THE EMBODIMENTS

The disclosure is described below with reference to the drawings and embodiments in detail. It should be noted that the embodiments of the disclosure and the characteristics of the embodiments may be combined with each other if there is no conflict.

It is to be noted that, terminologies such as "first" and "second" in the specification, claims and accompanying drawings of the disclosure are only used to distinguish similar objects, rather than to describe a special order or a precedence order.

Embodiment 1

Figure 1:
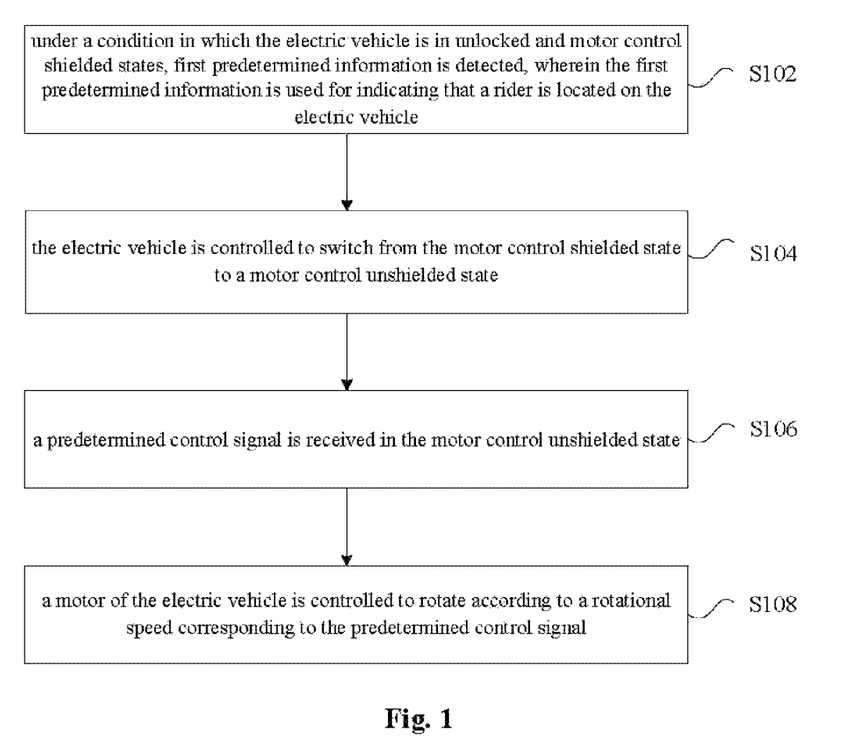
FIG. 1 is a flowchart of a method for controlling an electric vehicle according to an embodiment of the disclosure.

The embodiment of the disclosure provides a method for controlling an electric vehicle. FIG. 1 is a flowchart of a method for controlling an electric vehicle according to an embodiment of the disclosure. As shown in FIG. 1, the process may include the following steps.

At Step S102, under a condition in which the electric vehicle is in unlocked and motor control shielded states, first predetermined information is detected, wherein the first predetermined information is used for indicating that a rider is located on the electric vehicle.

At Step S104, the electric vehicle is controlled to switch from the motor control shielded state to a motor control unshielded state.

At Step S106, a predetermined control signal is received in the motor control unshielded state.

At Step S108, a motor of the electric vehicle is controlled to rotate according to a rotational speed corresponding to the predetermined control signal.

With the above steps, under the condition in which the electric vehicle is in the unlocked and motor control shielded states, the first predetermined information used for indicating that the rider is located on the electric vehicle is detected, the electric vehicle is controlled to switch from the motor control shielded state to the motor control unshielded state (the speed control component, such as an accelerator shifter, is activated), and then the rotational speed of the motor of the electric vehicle may be controlled via the predetermined control signal, so that it is assured that the electric vehicle may be ridden normally. The problems of complex operation and poor user experience of the manner for controlling the electric vehicle in the related art are solved, the operation process for controlling the electric vehicle is simplified and the user experience is improved.

In the step S102, under the condition in which the electric vehicle is in the unlocked and motor control shielded states, the first predetermined information is detected, wherein the first predetermined information is used for indicating that the rider is located on the electric vehicle.

Preferably, under a condition in which the electric vehicle is locked, the rider cannot use the electric vehicle. Hence, if the electric vehicle is used, it is necessary to unlock the electric vehicle. The locked state refers to that a power supply circuit powered by a power source of the electric vehicle for a motor is disconnected, and the unlocked state refers to that the power supply circuit powered by the power source of the electric vehicle is connected.

Generally, the electric vehicle is provided with an anti-theft alarm (or alarm) having an anti-theft alarm function (or, alarm function). The anti-theft alarm may be powered by a first power source, and may also be powered by other power supplies different from the first power source. The anti-theft alarm may be controlled by a remote controller to enable or disable the anti-theft alarm function. A sensor may be built in the anti-theft alarm. The activated anti-theft alarm may detect, via the built-in sensor, an alarm sound sent when the electric vehicle is collided. The anti-theft alarm function of the anti-theft alarm may be enabled and disabled via the remote controller.

Before the electric vehicle is unlocked, the anti-theft alarm of the electric vehicle may be closed. The closing manner may be that the electric vehicle receives a control signal sent by the remote controller and used for controlling to disable the anti-theft alarm function of the anti-theft alarm to disable the anti-theft alarm function of the anti-theft alarm.

The electric vehicle may include an electronic door lock switch, and the electric vehicle may be unlocked by inserting into a mechanical key of the electronic door lock switch of the electric vehicle and opening the electronic door lock switch.

In this embodiment of the disclosure, in order to simplify the unlocking operation process of the electric vehicle and save the system space of the electric vehicle, the electric vehicle may be unlocked before the first predetermined information is detected, under a condition in which the electric vehicle is locked (or in locked and kickstand folded states) and when target information matched with a stored target account number is detected.

Two states are provided for a kickstand of the electric vehicle, including a folded state and a placed-down state. The folded state refers to a state in which the kickstand of the electric vehicle takes no effect (i.e., a state in which the kickstand of the electric vehicle does not support the electric vehicle). The placed-down state refers to a state in which the kickstand of the electric vehicle takes the effect (i.e., a state in which the kickstand of the electric vehicle supports the electric vehicle). The kickstand of the electric vehicle may be a single-sided kickstand, and may also be a double-sided kickstand.

For the electric vehicle, the electronic door lock switch may be replaced with an electrical control component. The electrical control component may be integrated to a target component of the electric vehicle and is powered by a first power source. Under a condition in which the electric vehicle is locked, the electric vehicle may be in a low power consumption state, the first power source supplies the power to the electrical control component and the anti-theft alarm also works normally. Target information matched with a target account number may be stored in the electrical control component. When the target information matched with the target account number is detected, the electric vehicle may be unlocked by the electrical control component. Preferably, the first power source may be a battery having a small output voltage or a group of batteries having small output voltages, such as a 5# battery, a button battery and a 18650 type charging battery.

Preferably, the electrical control component may further be configured to control the anti-theft alarm to open and close. For example, when the target information matched with the target account number is detected, the electrical control component controls to close the anti-theft alarm.

With the above technical solutions in this embodiment of the disclosure, the rider does not need to operate the remote controller to close the anti-theft alarm, thus simplifying the operation steps.

The target component integrated with the electrical control component may be a component at any position of the electric vehicle, such as an instrument panel, an accelerator shifter, a saddle, a seat barrel, a combined switch, a rear view mirror, a front-rear lamp and a kickstand. Preferably, in order to facilitate the operation of the user, the target component may be the instrument panel of the electric vehicle.

Before the electric vehicle is unlocked, the target information matched with the stored target account number may be detected via multiple manners.

As an optional implementation manner, before the electric vehicle is unlocked, the method may further include the following steps: an input signal sent by a target device having a second wireless communication module via the second wireless communication module is received via a first wireless communication module of the electric vehicle, wherein the input signal carries account number information of a reference account number bound to the second wireless communication module; and under a condition of determining that the account number information is the target information, it is determined that the target information is detected.

The first wireless communication module and the second wireless communication module may interact via a wireless communication manner that may include but not limited to at least one of the following: a Near Field Communication (NFC) module, a Bluetooth, a Public Key Encryption (PKE) module, a Wireless Fidelity (wi-fi) module, a ZigBee module, an Ultra Wideband (UWB) module and a 433M wireless ad hoc network module, etc.

For example, the electrical control component may include the NFC module, and a card (physical card or virtual card) matched with the NFC module may be provided for the user together when the electric vehicle is purchased. The user may add the information (e.g., card number information for uniquely identifying the user card) of the card on a mobile device (e.g., a mobile phone) having an NFC function. In this way, the electric vehicle may be unlocked by the user by using the mobile device.

Upon the reception of a wireless signal sent by the NFC module on the mobile device, the NFC module on the electric vehicle may judge whether the card number information carried in the wireless signal is matched with the NFC module or not. Under a condition in which the card number information carried in the wireless signal is matched with the NFC module, the electric vehicle is controlled to be unlocked.

For example, the electrical control component may be the Bluetooth. The user may pair a mobile device (e.g., a mobile phone) having a Bluetooth with the Bluetooth on the electric vehicle. After successful pairing, the user may unlock the electric vehicle in a manner of connecting the two paired Blueteeths.

Upon the reception of a wireless signal sent by the Bluetooth on the mobile device, the Bluetooth on the electric vehicle may judge whether the device information carried in the wireless signal is matched with the device information of the Bluetooth or not. Under a condition in which the device information carried in the wireless signal is matched with the device information of the Bluetooth, the electric vehicle is controlled to be unlocked.

Other wireless communication modules (e.g., the PKE module, wi-fi module, ZigBee module, UWB module and 433M wireless ad hoc network module) are similar to the NFC module or the Bluetooth in unlocking manner, which will not be repeated herein.

As another optional implementation manner, before the electric vehicle is unlocked, biological characteristic information within a predetermined detection area is detected via a detection module of the electric vehicle; and under a condition of determining that the detected biological characteristic information is the target information, it is determined that the target information is detected.

The biological characteristic information may include at least one of the following: a fingerprint, a face, a sound and the like. The detection module may include at least one of the following: a fingerprint detection module (including a touch area) for detecting the fingerprint, a face detection module (including a camera) for detecting the face, and a sound detection module (including a microphone) for detecting the sound.

For example, the fingerprint, face and/or sound may be input by using the detection module and are stored in the electric vehicle. The sound may be a special segment of voice, e.g., "unlock the electric vehicle", and whether the target information is detected or not may be judged by detecting characteristics (e.g., tone) for distinguishing different sounds and the said contents.

With the technical solutions in this embodiment of the disclosure, the mechanical key is replaced by a manner of acquiring target characteristics via the wireless communication module or detection module integrated to the target component to unlock the electric vehicle and the rider does not need to carry the mechanical key, so the operation experience of the user is improved. Meanwhile, as the electronic door lock switch does not need to be installed, the electric vehicle no longer needs to reserve a space for the electronic door lock switch, and the structural briefness of the electric vehicle is improved.

In this embodiment of the disclosure, the step that the electric vehicle is unlocked may include the following step: a power supply circuit powered by a power source of the electric vehicle for the motor is connected by using a switch circuit of the electric vehicle to unlock the electric vehicle.

The electric vehicle may further include the switch circuit, and the switch circuit may be connected (directly connected or indirectly connected) to the electrical control component. Upon the detection of the target information matched with the stored target account number, the electrical control component may generate a control signal (such as a high level signal) and enables the control signal to act on the switch circuit of the electric vehicle, so as to connect the power supply circuit powered by the power source of the electric vehicle for the motor by using the switch circuit to unlock the electric vehicle.

The switch circuit may include: a triode (such as a switch triode), a field-effect transistor or an electromagnetic relay. By providing a control signal for a base of the triode, a grid of the field-effect transistor or a contact pin of the electromagnetic relay, the current between a collector and an emitter of the triode, the current between a source and a drain of the field-effect transistor, the current between a source and a drain of the field-effect transistor or the current between a common end and a normally open end of the electromagnetic relay are controlled to connect the power supply circuit.

Preferably, the switch circuit includes a triode, wherein a base of the triode is connected with the electrical control component, and is configured to connect the power supply circuit by adjusting a current between a collector and an emitter of the triode under the control of the electrical control component.

Preferably, the switch circuit includes a field-effect transistor, wherein a grid of the field-effect transistor is connected with the electrical control component, and is configured to connect the power supply circuit by adjusting a current between a source and a drain of the field-effect transistor under the control of the electrical control component.

Preferably, the switch circuit includes an electromagnetic relay, wherein a contact pin of the electromagnetic relay is connected with the electrical control component, and is configured to connect the power supply circuit by adjusting a current between a common end and a normally open end of the electromagnetic relay under the control of the electrical control component.

With the above technical solutions in this embodiment of the disclosure, the power supply circuit powered by the power source of the electric vehicle for the motor is connected by using the switch circuit, so the implementation solutions are simple, and the production cost of the electric vehicle may be saved.

In this embodiment of the disclosure, the step that under a condition in which the electric vehicle is in unlocked and motor control shielded states, first predetermined information is detected may include the following step: under the condition in which the electric vehicle is in the unlocked and motor control shielded states, the first predetermined information is detected by a target sensor mounted on a predetermined position of the electric vehicle.

The target sensor and a controller (such as a Central Processing Unit (CPU) chip) may be installed at a predetermined position of the electric vehicle. The target sensor is configured to detect the first predetermined information and send the first predetermined information to the controller, wherein the first predetermined information is used for indicating that the rider is located on the electric vehicle. The controller is configured to receive the first predetermined information, and control, under the condition in which the electric vehicle is in the unlocked and motor control shielded states, in response to the first predetermined information, the electric vehicle to convert from the motor control shielded state into the motor control unshielded state.

The target sensor may be configured to detect a predetermined type of target information, and transmit the target information to the controller, so that the controller judges whether the target information is the first predetermined information or not.

Preferably, the rider is located on the electric vehicle, which may be represented by a parameter obviously changed after the rider sits on the electric vehicle, such as a pressure, an image and a barometric pressure. The target sensor includes at least one of the following: a pressure sensor, an infrared sensor and a barometric pressure sensor.

Preferably, the first predetermined information is used for indicating that a bearing state at the predetermined position is a predetermined state, wherein the predetermined state is at least one of the following: the pressure at the predetermined position is greater than or equal to a first target threshold, the image at the predetermined position includes a target image, and the barometric pressure at the predetermined position is greater than or equal to a second target threshold.

Preferably, the predetermined position includes at least one of the following: a position below a seat cushion of the electric vehicle, a position on a pedal of the electric vehicle, a position on each of shifters at two sides of a handlebar of the electric vehicle, a vehicle body portion in front of the seat cushion of the electric vehicle, a position on a tire of the electric vehicle, a position in the electric vehicle, and a position in a shock absorber of the electric vehicle.

The predetermined state may include at least one of the following: a press-down pressure of the seat cushion of the electric vehicle is greater than or equal to a target pressure value; a pedaling frequency of the pedal of the electric vehicle is greater than or equal to a target frequency; a middle area of the image includes an image of a person; and a pressure value of the tire of the electric vehicle is greater than or equal to a target pressure value.

For example, after the rider sits on the electric vehicle, the pressure on the saddle of the electric vehicle is increased and a pressure sensor is disposed below the saddle. When the pressure sensor detects that the press-down pressure acted on the seat cushion is greater than or equal to the target pressure value, it may be determined that the rider is on the electric vehicle.

Also for example, after the rider sits on the electric vehicle, when the infrared sensor on the electric vehicle detects that the middle area of the predetermined detection area (detection area of the infrared sensor, including an area above the saddle) includes the image of the person, it may be determined that the rider is on the electric vehicle.

With the above technical solutions in this embodiment of the disclosure, under the condition in which the electric vehicle is in the unlocked and motor control shielded states, when the first predetermined information is detected, it is determined that the rider is on the electric vehicle, the electric vehicle is controlled to switch from the motor control shielded state, and the activation of the speed control component is implemented without user operation; and thus, the operation process is simplified, the user experience is smooth and the user experience is improved.

In the step S104, the electric vehicle is controlled to switch from the motor control shielded state to the motor control unshielded state.

The motor control shielded state refers to that a motor control signal generated via the speed control component (such as the accelerator shifter) and used for controlling the motor is shielded (the motor cannot be controlled via the speed control component). At this moment, although the controller of the electric vehicle may receive the motor control signal (e.g., by operating the motor control signal generated by the speed control component), the motor control signal is shielded. Therefore, the rotation of the motor cannot be controlled by operating the speed control component.

The motor control unshielded state refers to that the motor control signal generated via the speed control component (such as the accelerator shifter) and used for controlling the motor is unshielded (the motor may be controlled via the speed control component). At this moment, the control module of the electric vehicle may receive the motor control signal (e.g., by operating the motor control signal generated by the speed control component) and controls a rotational speed of the motor according to the motor control signal.

Preferably, after the electric vehicle is controlled to switch from the motor control shielded state to the motor control unshielded state, an electric vehicle state indicator lamp of the electric vehicle may be controlled to adjust from a first display state to a second display state, and/or, a prompt tone sent by the electric vehicle may be controlled to adjust from a first predetermined prompt tone to a second predetermined prompt tone, wherein the electric vehicle state indicator lamp is located on other positions, except for a position where an instrument is located, on the handlebar of the electric vehicle, or the electric vehicle state indicator lamp is located on an upper portion of a handlebar vertical pipe of the electric vehicle.

When the electric vehicle is in the motor control shielded state, the electric vehicle shields the motor control signal input by the speed control component of the electric vehicle, which indicates that the electric vehicle enters a stand-by state (i.e., the electric vehicle is in a power-on state, but the speed control component is in a non-use state and the electric vehicle cannot be ridden normally). In such a case, the current state may be indicated by controlling the electric vehicle state indicator lamp of the electric vehicle to turn on, and/or, controlling a sound sent by the electric vehicle. For example, it may be appropriate to control the electric vehicle state indicator lamp of the electric vehicle to turn on normally to give off yellow light and control the electric vehicle to make two "bang bang" sounds.

When the electric vehicle is in the motor control unshielded state, the electric vehicle may respond to the motor control signal input by the speed control component of the electric vehicle, which indicates that the electric vehicle enters a normal operation state and mat be ridden normally. In such a case, the current state may be indicated by controlling the electric vehicle state indicator lamp of the electric vehicle to turn on, and/or, controlling a sound sent by the electric vehicle. For example, it may be appropriate to control the indicator lamp of the electric vehicle to turn on normally to give off temporary white light and control the electric vehicle to make a "toot" sound.

In addition, it is to be noted that different states of the electric vehicle may be indicated jointly by different display manners of the electric vehicle state indicator lamp and different sounds sent by the electric vehicle. Preferably, the different states of the electric vehicle may be indicated only by the different display manners of the electric vehicle state indicator lamp or only by the different sounds sent by the electric vehicle.

Preferably, the electric vehicle state indicator lamp may be located on at least one of the following positions of the electric vehicle: an inside of a handle of the electric vehicle; an outside of the handle of the electric vehicle; and a position between the inside of the handle and the instrument, wherein the instrument is located at a middle position of the handlebar of the electric vehicle.

Preferably, one or more electric vehicle state indicator lamps may be provided.

Preferably, the electric vehicle state indicator lamp may include: an annular indicator lamp, a semi-circular indicator lamp, a point needle type indicator lamp and an elongated indicator lamp.

Preferably, the display manners of the electric vehicle state indicator lamp at least include one of the following: a display color of the indicator lamp; a display number of electric vehicle state indicator lamps when a plurality of electric vehicle state indicator lamps are provided; and a display shape of the electric vehicle state indicator lamp.

In the step S106, the predetermined control signal is received in the motor control unshielded state.

The electric vehicle in the motor control unshielded state may receive the predetermined control signal generated by operating the speed control component of the electric vehicle and used for controlling the rotation of the motor.

Preferably, in the motor control unshielded state, the predetermined control signal generated by operating the speed control component of the electric vehicle is received.

With the above technical solutions in this embodiment of the disclosure, the predetermined control signal is generated via the speed control component, which is simple and convenient and meets the operation habit of the user.

In the step S108, the motor of the electric vehicle is controlled to rotate according to the rotational speed corresponding to the predetermined control signal.

Upon the reception of the predetermined control signal, the controller of the electric vehicle may determine the rotational speed of the motor corresponding to the predetermined control signal. For example, the predetermined control signal may be generated by the number of turns (⅓ turn, ½ turn) at which the accelerator shifter is rotated. The greater the number of the rotated turns, the larger the rotational speed of the motor corresponding to the predetermined control signal.

In this embodiment of the disclosure, after the motor of the electric vehicle is controlled to rotate according to the rotational speed corresponding to the predetermined control signal, under a condition in which the electric vehicle is in unlocked and motor control unshielded states, second predetermined information may be detected, wherein the second predetermined information is used for indicating that the rider leaves away from the electric vehicle; and the electric vehicle is controlled to switch from the unshielded state to the motor control shielded state.

When the electric vehicle is in the unlocked and motor control unshielded states, the second predetermined information may be detected via a target sensor installed at a predetermined position of the electric vehicle.

Herein, the predetermined position and the target sensor are similar to the above, and will not be repeated herein.

The second predetermined signal is used for indicating that the rider leaves away from the electric vehicle. The rider leaves away from the electric vehicle, which may be represented by detecting a parameter obviously changed after the rider leaves away from the electric vehicle.

Preferably, the second predetermined information is used for indicating that a bearing state at the predetermined position is a non-predetermined state, and the predetermined state is similar to the above and will not be repeated herein.

The non-predetermined state may include at least one of the following: a press-down pressure of the seat cushion of the electric vehicle is smaller than a target pressure value; a pedaling frequency of the pedal of the electric vehicle is smaller than a target frequency; a middle area of the image excludes an image of a person; and a pressure value of the tire of the electric vehicle is smaller than a target pressure value.

For example, after the rider leaves away from the electric vehicle, the pressure on the saddle of the electric vehicle is decreased and a pressure sensor is disposed below the saddle. When the pressure sensor detects that the press-down pressure acted on the seat cushion is smaller than the target pressure value, it may be determined that the rider leaves away from the electric vehicle.

Also for example, after the rider leaves away from the electric vehicle, when the infrared sensor on the electric vehicle does not detect the image of the person in the predetermined detection area (detection area of the infrared sensor, including an area above the saddle), it may be determined that the rider leaves away from the electric vehicle.

With the above technical solutions in this embodiment of the disclosure, when the rider leaves away from the electric vehicle, the speed control component is locked automatically, so that pressing the P-gear button to lock the speed control component turns out to be unnecessary and the control steps of the electric vehicle are simplified.

In this embodiment of the disclosure, after the electric vehicle is controlled to switch from the motor control unshielded state to the motor control shielded state, under a condition in which the time that the electric vehicle is continuously in the unlocked and motor control shielded states, a wheel speed is zero and a kickstand is in a placed-down state exceeds a target time threshold, the electric vehicle is locked.

When the electric vehicle is continuously in the unlocked and motor control shielded states, and the wheel speed is zero, the electric vehicle may be locked in a manner of rotating the electronic door lock switch with the mechanical key.

In this embodiment of the disclosure, in order to simplify the locking operation process of the electric vehicle, under a condition in which the time that the electric vehicle is continuously in the unlocked and motor control shielded states, the wheel speed is zero and the kickstand is in the placed-down state exceeds the target time threshold (such as 3 s and 5 s), the electric vehicle is locked.

The operation of detecting and unlocking in the motor control shielded state and zero rotational speed may be triggered via a state of the kickstand. Under a condition in which the kickstand of the electric vehicle is placed down, upon the detection of the time that the electric vehicle is continuously in the unlocked and motor control shielded states and the rotational speed is zero exceeding the target time threshold, the electric vehicle is locked. When the kickstand of the electric vehicle is folded, even through the electric vehicle is in the unlocked and motor control shielded states and the rotational speed is zero, the electric vehicle is not locked. Whether the electric vehicle is folded or placed down or not may be detected via a Hall sensor on the kickstand.

For example, when the electric vehicle is in a special scene (e.g., the electric vehicle is located in an elevator), the kickstand of the electric vehicle is folded. Although the electric vehicle is in the unlocked and motor control shielded (the person leaves away from a seat chair of the electric vehicle) states and the wheel speed is zero (a wheel of the electric vehicle is not rotated), the electric vehicle is not locked.

The power supply circuit powered by the power source of the electric vehicle for the motor may be disconnected by using the switch circuit of the electric vehicle to lock the electric vehicle. Under the condition in which the time that the electric vehicle is continuously in the unlocked and motor control shielded states and the rotational speed is zero exceeds the target time threshold, the electric control component may generate a control signal (such as low-level signal) and enables the control signal to act on the switch circuit of the electric vehicle, so as to disconnect the power supply circuit by using the switch circuit to lock the electric vehicle.

The switch circuit may include one of the following: a switch triode, a field-effect transistor and an electromagnetic relay. By providing a control signal for a base of the switch triode, a grid of the field-effect transistor or a contact pin of the electromagnetic relay, the current between a collector and an emitter of the switch triode, the current between a source and a drain of the field-effect transistor, the current between a source and a drain of the field-effect transistor or the current between a common end and a normally open end of the electromagnetic relay are controlled to disconnect the power supply circuit.

Preferably, the opening of the anti-theft alarm may also be controlled by using the electrical control component. For example, when the electric vehicle is in the unlocked and motor control shielded states, if the first predetermined information is not detected within the target time threshold, the anti-theft alarm is opened. The operation of the remote controller turns out to be unnecessary and the operation steps are simplified.

With the above technical solutions in this embodiment of the disclosure, upon the detection of the time that the electric vehicle is continuously in the unlocked and motor control shielded states, the wheel speed is zero and the kickstand is in the placed-down state exceeding the target time threshold, the electric vehicle is locked automatically; and thus, the locking process of the electric vehicle is simplified and the user experience is improved.

The method for controlling the electric vehicle will be described below in conjunction with specific examples. In this embodiment, the electric vehicle may be an electric motorcycle, an electric bicycle and a portable electric motorcycle.

Figure 2:
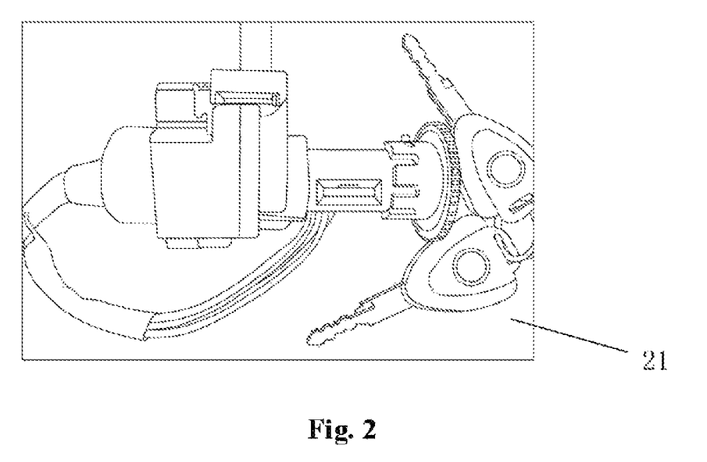
FIG. 2 is a schematic diagram of an electric door lock module in the related art.
Figure 3:
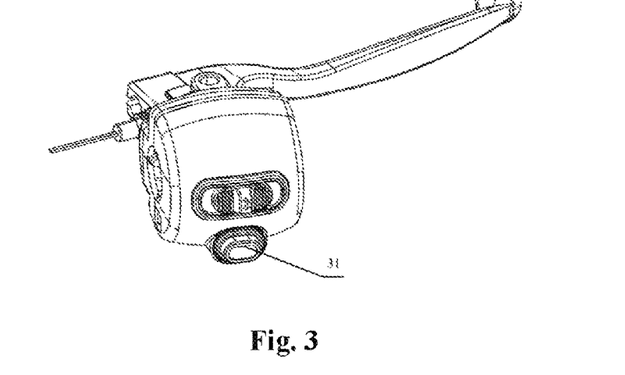
FIG. 3 is a schematic diagram of a mechanical key and a remote controller in the related art.
Figure 4:
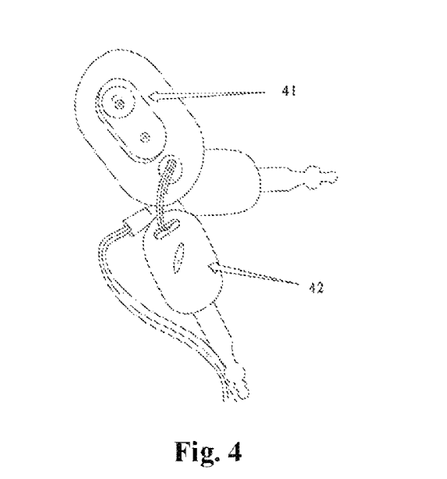
FIG. 4 is a schematic diagram of a P-gear button in the related art.

In the operation manner of the conventional electric vehicle, modules of many machines need to be operated artificially, such as an electronic door lock switch (like the electronic door lock switch shown in FIG. 2), a P-gear button (as shown in a left-hand combined switch in FIG. 3, the vehicle is powered on, and the remote controller is in an unlocked state, and after the start switch 31 is pressed down, the lamp of the instrument P is turned off and the vehicle may drive normally), and a remote controller (as shown in FIG. 4, the rider needs to carry the remote controller 41 and the mechanical key 42 of the electronic door lock switch). As a result, the operation of the electric vehicle is troublesome and the experience is poor. Moreover, the driver (rider) needs to carry the key and the remote controller, thus being very inconvenient.

In the method for controlling the electric vehicle in this example, a near electric vehicle unlocking manner (via a miniature mobile device having an NFC module such as a mobile phone, a bracelet and a card, fingerprint identification, sound identification or face identification) is adopted to replace the remote controller and key of the machine to implement the locking, unlocking, starting and closing of the vehicle. A seat cushion detection sensor technology is adopted to the P-gear button of the machine, so the activation and deactivation of the accelerator shifter as well as the automatic locking of the electric vehicle are implemented.

Hereinafter, the process of the method for controlling the electric vehicle in this example is described. The method for controlling the electric vehicle may mainly include the following steps.

At Step 1, upon the detection that a driver is close to an electric vehicle, the electric vehicle is unlocked.

The driver is close to the electric vehicle for unlocking. The near electric vehicle unlocking may be implemented via an NFC module identification, fingerprint identification, sound identification or face identification technologies. That is, the technical solutions of the mechanical key and the remote controller are replaced with the technical solutions such as NFC module, fingerprint unlocking, Bluetooth unlocking, face identification and sound identification.

Figure 5:
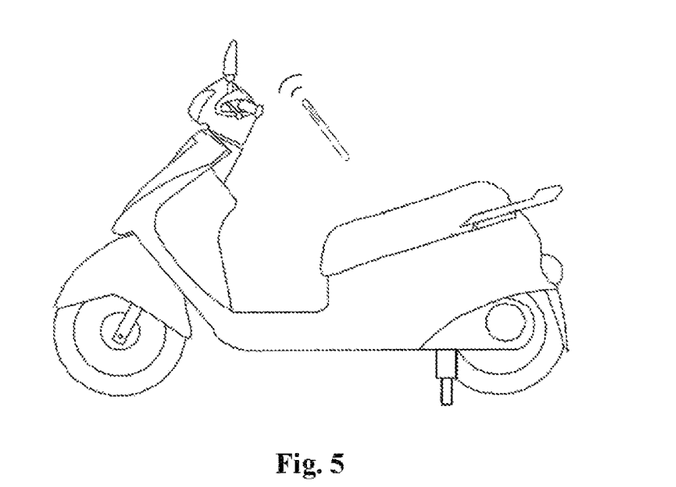
FIG. 5 is a schematic diagram of a method for controlling an electric vehicle according to an embodiment of the disclosure.

For the NFC module, the miniature mobile device having the NFC module (such as the mobile phone, the bracelet and the card, as shown in FIG. 5) may be employed to replace the electronic door lock switch and remote controller to implement the unlocking to the electric vehicle.

When the corresponding device and human body are close or are attached to some position of the electric vehicle (an electrical control system for identifying the NFC module or fingerprint or sound or image is mounted at this position), the electrical control system (including the electrical control component and other components powered by a power source) of the electric vehicle identifies the corresponding signal and is then powered on automatically. Therefore, the electrical control system is started.

When the driver is close to the electric vehicle, the electric vehicle is unlocked automatically; and moreover, the anti-theft alarm may further be automatically closed. The mechanical key and the remote controller do not need to be carried, thus being convenient and quick.

At Step 2, upon the detection that the driver sits on a seat cushion, an accelerator shifter is activated automatically.

A seat cushion detection sensor may be adopted to replace the mechanical P-gear button to implement automatic control on activation and deactivation of the accelerator shifter.

Various seat cushion detection sensors may be provided, and a pressure sensor, an infrared sensor, a barometric sensor and the like are commonly seen.

The position where the detection sensor is installed as a replacement of the P-gear button may not be below the seat cushion, and the detection sensor may be installed on a pedal, or on shifters at two sides of the handlebar, or on a vehicle body portion in front of the seat cushion, or on a tire, or in the tire, or in a shock absorber, or at the above several positions, etc. The specific installation position may be set as required.

For the driver, after the driver sits on the seat cushion, the seat cushion detection sensor automatically senses a signal and automatically activates the accelerator shifter, so that the driver may normally use the accelerator shifter to ride the electric vehicle without pressing the P-gear button.

At Step 3, upon the detection that the accelerator handlebar rotates, a motor is controlled to rotate to ride normally.

After the accelerator handlebar is activated, upon the detection that the accelerator handlebar rotates, a rotational speed of the motor is controlled according to rotation, thus controlling a form speed of the electric vehicle and guaranteeing a normal form of the electric vehicle.

Concerning the driver, the driver rotates the accelerator handlebar to ride normally.

At Step 4, upon the arrival of a destination, the driver leaves the seat cushion for parking (the vehicle is locked automatically).

Upon the arrival of the destination, when the driver leaves the seat cushion for parking, the seat cushion detection sensor automatically senses a signal and the function of the accelerator handlebar is disabled automatically; and after predetermined time (such as 3-5 s), the electric vehicle is automatically locked.

After the driver leaves the seat cushion upon the arrival of the destination, the electric vehicle is locked automatically, pressing the P-gear button turns out to be unnecessary, the mechanical key corresponding to the electronic door lock switch is rotated and is pulled out, and the remote controller is pressed to start the anti-theft alarm.

With the technical solutions in this example, by employing the near electric vehicle unlocking (NFC module identification or fingerprint identification or sound identification or face identification technology, etc) and the seat cushion detection sensor to replace the remote controller, key and the P-gear button of the machine, the operation manner of the electric vehicle is simple, the process is simplified, the user experience is very smooth and the cost is also greatly reduced.

Through the above description of the implementation manner, those skilled in the art may clearly understand that the method according to the above embodiment may be implemented through software in connection with a necessary general hardware platform, or may be implemented by hardware. However, in many cases, the former is a better implementation. Based on this understanding, the technical solution of the embodiment of the disclosure in essence or the part contributing to the prior art may be embodied in the form of a software product. The computer software product is stored in a storage medium (such as a ROM/RAM, a magnetic disc, an optical disc), including several instructions which may cause a terminal device (such as a mobile phone, a computer, a server, or a network device and the like) to execute the method according to the embodiments of the disclosure.

Embodiment 2

The embodiment further provides an electric vehicle. The electric vehicle is configured to implement the above embodiment and preferred implementation manner and contents that have been described will not be repeated. As used herein, the term "module" may implement a combination of software and/or hardware with a predetermined function. Although the apparatus described in the following embodiment is implemented by the software preferably, it may also be conceivable to implement with the combination of the software and the hardware.

Figure 6:
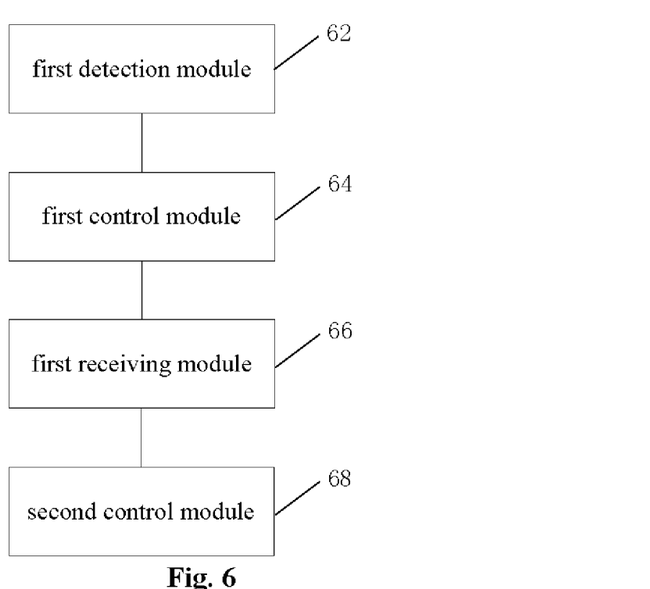
FIG. 6 is a structural block diagram of an electric vehicle according to an embodiment of the disclosure.

FIG. 6 is a structural block diagram of an electric vehicle according to an embodiment of the disclosure. As shown in FIG. 6, the electric vehicle may include: a first detection module 62, a first control module 64, a first receiving module 66 and a second control module 68.

The first detection module 62 is configured to detect, under a condition in which the electric vehicle is in unlocked and motor control shielded states, first predetermined information, wherein the first predetermined information is used for indicating that a rider is located on the electric vehicle.

The first control module 64 is connected to the first detection module 62, and is configured to control the electric vehicle to switch from the motor control shielded state to a motor control unshielded state.

The first receiving module 66 is connected to the first control module 64 and is configured to receive a predetermined control signal in the motor control unshielded state.

The second control module 68 is connected to the first receiving module 66 and is configured to control a motor of the electric vehicle to rotate according to a rotational speed corresponding to the predetermined control signal.

Preferably, the electric vehicle may further include: an unlocking module, connected to the first detection module 62 and configured to unlock, before the first predetermined information is detected, under a condition in which the electric vehicle is locked (or in locked and kickstand folded states) and when target information matched with a stored target account number is detected, the electric vehicle.

Preferably, the electric vehicle may further include: a second receiving module and a first determination module.

The second receiving module is connected to the unlocking module, and is configured to receive, before the electric vehicle is unlocked, via a first wireless communication module of the electric vehicle, an input signal sent by a target device having a second wireless communication module via the second wireless communication module, wherein the input signal carries account number information of a reference account number bound to the second wireless communication module.

The first determination module is connected to the second receiving module, and is configured to determine, under a condition of determining that the account number information is the target information, that the target information is detected.

Preferably, the electric vehicle may further include: a second detection module and a second determination module.

The second detection module is connected to the unlocking module, and is configured to detect, before the electric vehicle is unlocked, biological characteristic information within a predetermined detection area via a detection module of the electric vehicle The second determination module is connected to the second detection module, and is configured to determine, under a condition of determining that the detected biological characteristic information is the target information, that the target information is detected.

Preferably, the unlocking module includes: a connection module, configured to connect a power supply circuit powered by a power source of the electric vehicle for the motor by using a switch circuit of the electric vehicle to unlock the electric vehicle.

Preferably, the first detection module may include: a detection unit, configured to detect, under the condition in which the electric vehicle is in the unlocked and motor control shielded states, the first predetermined information by a target sensor mounted on a predetermined position of the electric vehicle.

Preferably, the first receiving module may include: a receiving unit, configured to receive the predetermined control signal generated by operating a speed control component of the electric vehicle in the motor control unshielded state.

Preferably, the electric vehicle may further include: a third detection module and a third control module.

The third detection module is connected to the second control module, and is configured to detect, after the motor of the electric vehicle is controlled to rotate according to the rotational speed corresponding to the predetermined control signal, under a condition in which the electric vehicle is in unlocked and motor control unshielded states, second predetermined information, wherein the second predetermined information is used for indicating that the rider leaves away from the electric vehicle.

The third control module is connected to the third detection module, and is configured to control the electric vehicle to switch from the unshielded state to the motor control shielded state.

Preferably, the electric vehicle may further include: a locking module, connected to the third control module and configured to lock, after the electric vehicle is controlled to switch from the motor control unshielded state to the motor control shielded state, under a condition in which the time that the electric vehicle is continuously in the unlocked and motor control shielded states, a wheel speed is zero and a kickstand is in a placed-down state exceeds a target time threshold, the electric vehicle.

Preferably, the electric vehicle may further include: a fourth control module, configured to control, after the electric vehicle is controlled to switch from the motor control unshielded state to the motor control shielded state, an electric vehicle state indicator lamp of the electric vehicle to adjust from a first display state to a second display state, and/or, control a prompt tone sent by the electric vehicle to adjust from a first predetermined prompt tone to a second predetermined prompt tone, wherein the electric vehicle state indicator lamp is located on other positions, except for a position where an instrument is located, on the handlebar of the electric vehicle, or the electric vehicle state indicator lamp is located on an upper portion of a handlebar vertical pipe of the electric vehicle.

It is to be noted that each of the above modules may be implemented via software or hardware, and the later may be implemented via the following manner but is not limited to this: the above modules are located in a same processor; or each of the above modules is located in a different processor in any combined form.

Embodiment 3

The embodiment of the disclosure further provides a storage medium. A computer program is stored in the storage medium. The computer program is configured to execute the steps in any of the above method embodiments at runtime.

Preferably, in this embodiment, the storage medium may be configured to store the computer program for executing the following steps.

At S1, under a condition in which the electric vehicle is in unlocked and motor control shielded states, first predetermined information is detected, wherein the first predetermined information is used for indicating that a rider is located on the electric vehicle.

At S2, the electric vehicle is controlled to switch from the motor control shielded state to a motor control unshielded state.

At S3, a predetermined control signal is received in the motor control unshielded state.

At S4, a motor of the electric vehicle is controlled to rotate according to a rotational speed corresponding to the predetermined control signal.

Preferably, in this embodiment, the above storage medium may include but not limited to: various media capable of storing the computer program such as a U disk, a Read-Only Memory (abbreviated as ROM), a Random Access Memory (abbreviated as RAM), a mobile hard disk, a magnetic disk or an optical disc.

Preferably, the specific examples in this embodiment may be referred to the examples described in the above embodiments and optional implementation manners, and will not be repeated here in this embodiment.

It is apparent that those skilled in the art should know that each module or each step of the disclosure may be implemented by a universal computing device, and the modules or steps may be concentrated on a single computing device or distributed on a network formed by a plurality of computing devices, and may Preferably be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the disclosure is not limited to any specific hardware and software combination.

The above are only the preferred embodiments of the disclosure and are not intended to limit the disclosure. For those skilled in the art, the disclosure may have various modifications and variations. Any modifications, equivalent replacements, improvements and the like made within the principle of the disclosure shall fall within the scope of protection of the disclosure.

What is claimed is:

1. A method for controlling an electric vehicle, comprising:
under a condition in which the electric vehicle is locked, when target information matched with a stored target account number is detected, unlocking, by an unlocking module, the electric vehicle and automatically closing an anti-theft alarm of the electric vehicle, wherein the unlocked electric vehicle is in motor control shielded state;
under a condition in which the electric vehicle is in unlocked and motor control shielded states, detecting, by a first detection module, first predetermined information, wherein the first predetermined information is used for indicating that a rider is located on the electric vehicle;
in response to the first predetermined information, controlling, by a first control module, the electric vehicle to switch from the motor control shielded state to a motor control unshielded state;
receiving a predetermined control signal in the motor control unshielded state;
controlling, by a second control module, a motor of the electric vehicle to rotate according to a rotational speed corresponding to the predetermined control signal,
under a condition in which the electric vehicle is in unlocked and motor control unshielded states, detecting, by a third detection module, second predetermined information, wherein the second predetermined information is used for indicating that the rider leaves away from the electric vehicle;
controlling, by a third control module, the electric vehicle to switch from the motor control unshielded state to the motor control shielded state; and
under a condition in which the time that the electric vehicle is continuously in the unlocked and motor control shielded states, a wheel speed is zero and a kickstand is in a placed-down state exceeds a target time threshold, locking the electric vehicle.

2. The method as claimed in claim 1, wherein before unlocking the electric vehicle, the method further comprises:
receiving, via a first wireless communication module of the electric vehicle, an input signal sent by a target device having a second wireless communication module via the second wireless communication module, wherein the input signal carries account number information of a reference account number bound to the second wireless communication module; and
under a condition of determining that the account number information is the target information, determining that the target information is detected;
or,
detecting biological characteristic information within a predetermined detection area via a detection module of the electric vehicle; and
under a condition of determining that the detected biological characteristic information is the target information, determining that the target information is detected.

3. The method as claimed in claim 1, wherein the unlocking the electric vehicle comprises:
connecting a power supply circuit powered by a power source of the electric vehicle for the motor by using a switch circuit of the electric vehicle to unlock the electric vehicle.

4. The method as claimed in claim 1, wherein before detecting, by the first detection module, the first predetermined information, the method further comprises:
under a condition in which the electric vehicle is in locked and kickstand folded states, when target information matched with a stored target account number is detected, unlocking the electric vehicle.

5. The method as claimed in claim 1, wherein the under a condition in which the electric vehicle is in unlocked and motor control shielded states, detecting, by a first detection module, first predetermined information comprises:
under the condition in which the electric vehicle is in the unlocked and motor control shielded states, detecting, by the first detection module, the first predetermined information by a target sensor mounted on a predetermined position of the electric vehicle;
the target sensor comprises at least one of the following: a pressure sensor, the predetermined position of the pressure sensor comprises at least one of the following: a position below a seat cushion of the electric vehicle, a position on a pedal of the electric vehicle, a position on each of shifters at two sides of a handlebar of the electric vehicle, a vehicle body portion in front of the seat cushion of the electric vehicle, a position on a tire of the electric vehicle, a position in the electric vehicle, and a position in a shock absorber of the electric vehicle; an infrared sensor, the predetermined position of the infrared sensor comprises at least one of the following: a position below a seat cushion of the electric vehicle, a position on a pedal of the electric vehicle, a position on each of shifters at two sides of a handlebar of the electric vehicle, a vehicle body portion in front of the seat cushion of the electric vehicle; and a barometric pressure sensor, the predetermined position of the barometric pressure sensor comprises at least one of the following: a position below a seat cushion of the electric vehicle, a position on a pedal of the electric vehicle, a position on each of shifters at two sides of a handlebar of the electric vehicle, a vehicle body portion in front of the seat cushion of the electric vehicle, a position on a tire of the electric vehicle, a position in the electric vehicle, and a position in a shock absorber of the electric vehicle;

the first predetermined information is used for indicating that a bearing state at the predetermined position is a predetermined state, wherein the predetermined state is at least one of the following: the pressure at the predetermined position is greater than or equal to a first target threshold, an image at the predetermined position includes an image of a person, and the barometric pressure at the predetermined position is greater than or equal to a second target threshold.

6. The method as claimed in claim 1, wherein the receiving a predetermined control signal in the motor control unshielded state comprises:

in the motor control unshielded state, receiving the predetermined control signal generated by operating a speed control component of the electric vehicle.

7. The method as claimed in claim 1, wherein after controlling, by the third control module, the electric vehicle to switch from the motor control shielded state to the motor control unshielded state, the method further comprises:

controlling, by a fourth control module, an electric vehicle state indicator lamp of the electric vehicle to adjust from a first display state to a second display state, and/or, controlling, by a fourth control module, a prompt tone sent by the electric vehicle to adjust from a first predetermined prompt tone to a second predetermined prompt tone, wherein the electric vehicle state indicator lamp is located on other positions, except for a position where an instrument is located, on the handlebar of the electric vehicle, or the electric vehicle state indicator lamp is located on an upper portion of a handlebar vertical pipe of the electric vehicle.

8. An electric vehicle, comprising:

an unlocking module, configured to, under a condition in which the electric vehicle is locked, when target information matched with a stored target account number is detected unlock the electric vehicle and automatically close an anti-theft alarm of the electric vehicle, wherein the unlocked electric vehicle is in motor control shielded state;

a first detection module, configured to detect, under a condition in which the electric vehicle is in unlocked and motor control shielded states, first predetermined information, wherein the first predetermined information is used for indicating that a rider is located on the electric vehicle;

a first control module, configured to, in response to the first predetermined information, control the electric vehicle to switch from the motor control shielded state to a motor control unshielded state;

a first receiving module, configured to receive a predetermined control signal in the motor control unshielded state;

a second control module, configured to control a motor of the electric vehicle to rotate according to a rotational speed corresponding to the predetermined control signal;

a third detection module, configured to detect, after the motor of the electric vehicle is controlled to rotate according to the rotational speed corresponding to the predetermined control signal, under a condition in which the electric vehicle is in unlocked and motor control unshielded states, second predetermined information, wherein the second predetermined information is used for indicating that the rider leaves away from the electric vehicle;

a third control module, configured to control the electric vehicle to switch from the motor control unshielded state to a motor control shielded state; and a locking module, configured to lock, after the electric vehicle is controlled to switch from the motor control unshielded state to the motor control shielded state, under a condition in which the time that the electric vehicle is continuously in the unlocked and motor control shielded states, a wheel speed is zero and a kickstand is in a placed-down state exceeds a target time threshold, the electric vehicle.

9. The electric motor as claimed in claim 8, wherein the electric vehicle further comprises:

a second receiving module, configured to receive, before the electric vehicle is unlocked, via a first wireless communication module of the electric vehicle, an input signal sent by a target device having a second wireless communication module via the second wireless communication module, wherein the input signal carries account number information of a reference account number bound to the second wireless communication module; and a first determination module, configured to determine, under a condition of determining that the account number information is the target information, that the target information is detected;

or, a second detection module, configured to detect, before the electric vehicle is unlocked, biological characteristic information within a predetermined detection area via a detection module of the electric vehicle; and a second determination module, configured to determine, under a condition of determining that the detected biological characteristic information is the target information, that the target information is detected.

10. The electric motor as claimed in claim 8, wherein the unlocking module comprises:

a connection module, configured to connect a power supply circuit powered by a power source of the electric vehicle for the motor by using a switch circuit of the electric vehicle to unlock the electric vehicle.

11. The electric motor as claimed in claim 8, wherein the electric vehicle further comprises:

an unlocking module, configured to unlock, under a condition in which the electric vehicle is in locked and kickstand folded states, when target information matched with a stored target account number is detected, the electric vehicle.

12. The electric motor as claimed in claim 8, wherein the first detection module comprises:

a detection unit, configured to detect, under the condition in which the electric vehicle is in the unlocked and motor control shielded states, the first predetermined information by a target sensor mounted on a predetermined position of the electric vehicle.

13. The electric motor as claimed in claim 8, wherein the first receiving module comprises:

a receiving unit, configured to receive, in the motor control unshielded state, the predetermined control signal generated by operating a speed control component of the electric vehicle.

14. The electric motor as claimed in claim 8, wherein the electric vehicle further comprises:

a fourth control module, configured to control, after the electric vehicle is controlled to switch from the motor control unshielded state to the motor control shielded state, an electric vehicle state indicator lamp of the electric vehicle to adjust from a first display state to a second display state, and/or, control a prompt tone sent by the electric vehicle to adjust from a first predetermined prompt tone to a second predetermined prompt tone, wherein the electric vehicle state indicator lamp is located on other positions, except for a position where an instrument is located, on the handlebar of the electric vehicle, or the electric vehicle state indicator lamp is located on an upper portion of a handlebar vertical pipe of the electric vehicle.

\* \* \* \* \*